United States Patent
Hui et al.

(10) Patent No.: US 9,331,931 B2
(45) Date of Patent: May 3, 2016

(54) PATH SELECTION BASED ON HOP METRIC DISTRIBUTIONS

(75) Inventors: Jonathan W. Hui, Foster City, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 355 days.

(21) Appl. No.: 13/406,795

(22) Filed: Feb. 28, 2012

(65) Prior Publication Data

US 2013/0223229 A1    Aug. 29, 2013

(51) Int. Cl.
*H04W 40/02*    (2009.01)
*H04L 12/721*   (2013.01)

(52) U.S. Cl.
CPC ............ *H04L 45/123* (2013.01); *H04L 45/124* (2013.01); *H04W 40/02* (2013.01)

(58) Field of Classification Search
USPC .......................................................... 370/238
See application file for complete search history.

(56) References Cited

U.S. PATENT DOCUMENTS

| | | |
|---|---|---|
| 6,370,119 B1 | 4/2002 | Basso et al. |
| 6,697,333 B1 * | 2/2004 | Bawa et al. ................... 370/238 |
| 6,850,486 B2 | 2/2005 | Saleh et al. |
| 6,856,627 B2 | 2/2005 | Saleh et al. |
| 6,934,249 B1 | 8/2005 | Bertin et al. |
| 7,002,917 B1 | 2/2006 | Saleh |
| 7,023,879 B1 | 4/2006 | Sitaraman et al. |
| 7,334,047 B1 | 2/2008 | Pillay-Esnault |
| 7,352,692 B1 | 4/2008 | Saleh et al. |
| 7,502,313 B2 | 3/2009 | Saleh et al. |
| 7,593,377 B2 | 9/2009 | Thubert et al. |
| 7,668,119 B2 | 2/2010 | Thubert et al. |
| 7,702,816 B2 | 4/2010 | Narayanan et al. |
| 7,729,337 B2 | 6/2010 | Saleh et al. |
| 7,778,235 B2 | 8/2010 | Thubert et al. |
| 7,940,777 B2 | 5/2011 | Asati et al. |
| 7,995,481 B2 | 8/2011 | Kokje et al. |
| 2003/0033394 A1 * | 2/2003 | Stine ............................. 709/222 |
| 2007/0153707 A1 | 7/2007 | Thubert et al. |
| 2011/0231573 A1 | 9/2011 | Vasseur et al. |

OTHER PUBLICATIONS

JP Vasseur et al.,"Routing Metrics used for Path Calculation in Low Power and Lossy Networks", Mar. 22 2010, DRAFT-IETF-Roll-Routing-Metrics-05.txt IETF, pp. 1-29.*
Valentini G et al."Dynamic multi-objective routing algorithm: a multi-objective routing algorithm for the simple hybrid routing protocol on wireless sensor networks", Sep. 24 2010, IET Communications, vol. 4, pp. 1732-1741.*
Alnajjar, et al., "SNR/RP Aware Routing Algorithm: Cross-Layer Design for Manets", International Journal of Wireless & Mobile Netowrks (IJWMN), vol. 1, No. 2, Nov. 2009, pp. 127-136.

(Continued)

*Primary Examiner* — Adnan Baig
(74) *Attorney, Agent, or Firm* — Parker Ibrahim & Berg LLC; James M. Behmke; Stephen D. LeBarron

(57) ABSTRACT

In one embodiment, a network device determines, for each particular path of a plurality of paths in a computer network, a hop metric distribution that indicates, for each interval of the hop metric distribution, a number of hops along the particular path that have a hop metric value within a corresponding interval. As such, the device may then select a path from the plurality of paths that minimizes the number of hops with correspondingly poor hop metric values along the selected path based on the hop metric distribution, and may forward traffic on the selected path, accordingly.

20 Claims, 11 Drawing Sheets

| PATH 1 | |
|---|---|
| INTERVAL 510 | # HOPS 520 |
| PLUG-IN | 2 |
| BATTERY | 1 |
| LOW BATTERY | 1 |

500

| PATH 2 | |
|---|---|
| INTERVAL 510 | # HOPS 520 |
| PLUG-IN | 1 |
| BATTERY | 2 |
| LOW BATTERY | 1 |

500

(56) References Cited

OTHER PUBLICATIONS

Pavkovic, et al., "Multipath Opportunistic RPL Routing Over IEEE 802.15.4", ACM MSWiM'11, Oct.-Nov. 2011, 8 pages.

Winter, et al., "RPL: IPv6 Routing Protocol for Low Power and Lossy Networks", draft-iet-froll-rpl-19, IETF Internet-Draft; Mar. 2011, 164 pages.

Barrio Baranano, et al., "Notification of Transmittal of the International Search Report and the Written Opinion of the International Searching Authority, or the Declaration", Patent Cooperation Treaty, May 16, 2013, 12 pages, PCT/US2013/028290, European Patent Office, Rijswijk, Netherlands.

Valentini, et al., "Dynamic Multi-Objective Routing Algorithm: A Multi-Objective Routing Algorithm for the Simple Hybrid Routing Protocol on Wireless Sensor Networks", IET Commun., Mar. 2010, vol. 4, Iss. 14, pp. 1732-1741.

Vasseur, et al., "Routing Metrics Used for Path Calculation in Low Power and Lossy Networks", Network Working Group, Internet Draft, Mar. 2010, 29 pages, draft-ietf-roll-routing-metrics-05.

\* cited by examiner

US 9,331,931 B2

PATH SELECTION BASED ON HOP METRIC DISTRIBUTIONS

TECHNICAL FIELD

The present disclosure relates generally to computer networks, and, more particularly, to routing protocol path selection within computer networks.

BACKGROUND

Many different types of computer networks implement dynamic routing protocols to configure routes for delivering messages to their destination. The routing protocol chooses routes by optimizing path cost metrics and may be subject to constraints. Compared with more traditional (e.g., wired) networks, the strict resource constraints (e.g., limited memory, computation, and communication capabilities) combined with highly dynamic link characteristics typical of Low power and Lossy Networks (LLNs) pose a number of challenges for dynamic routing protocols. That is, while route stability is generally important for any network, it can be especially important in LLNs due to their resource constraints. Link failures can cause expensive route repair operations. Effects on end-to-end communication performance (e.g., latency, throughput, and reliability) are difficult to maintain in the presence of link failures, especially in such resource-constrained environments.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
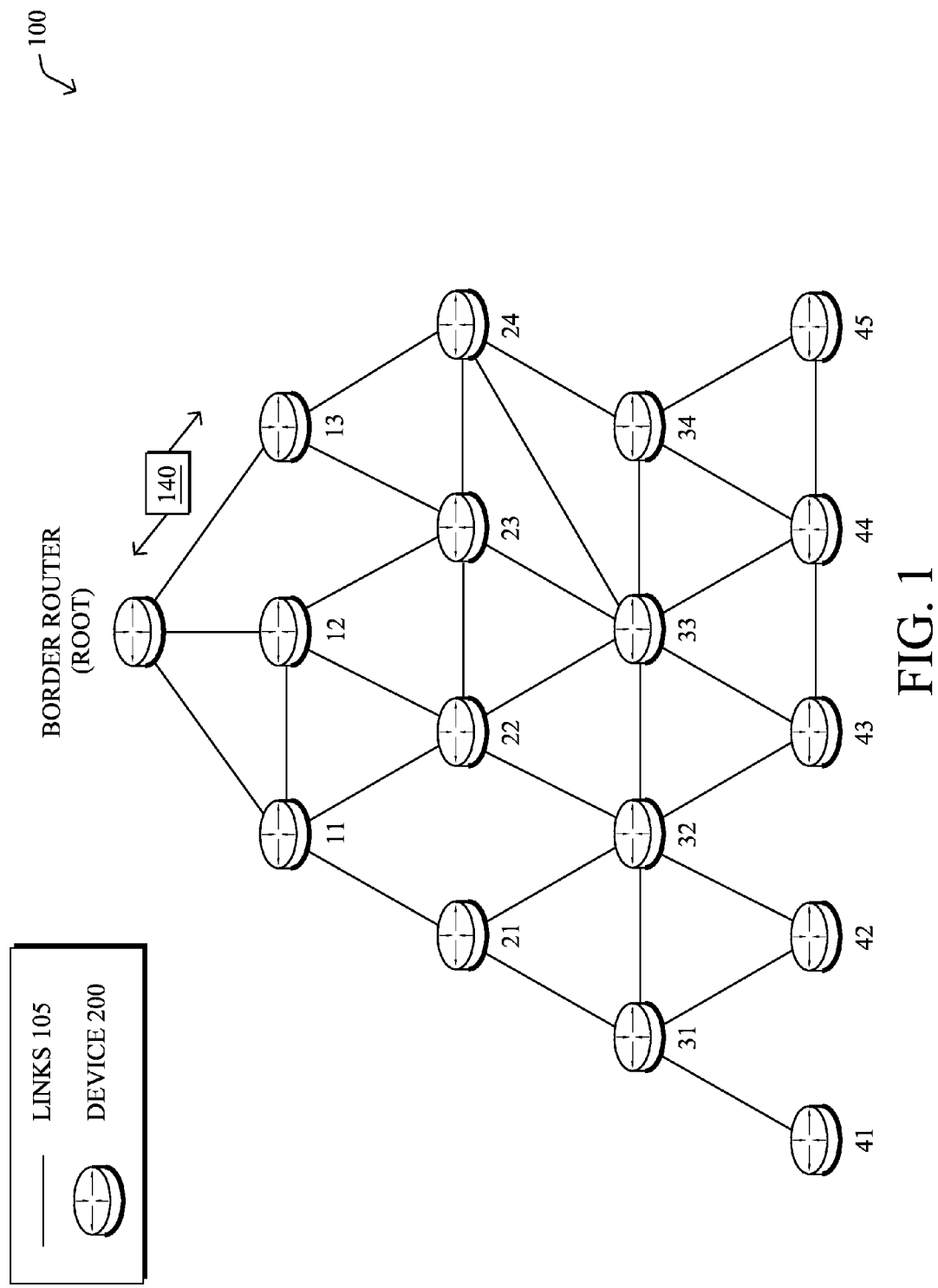
FIG. 1 illustrates an example computer network.

According to one or more embodiments of the disclosure, a network device determines, for each particular path of a plurality of paths in a computer network, a hop metric distribution that indicates, for each interval of the hop metric distribution, a number of hops along the particular path that have a hop metric value within a corresponding interval. As such, the device may then select a path from the plurality of paths that minimizes the number of hops with correspondingly poor hop metric values along the selected path based on the hop metric distribution, and may forward traffic on the selected path, accordingly.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), personal area networks (PANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "border router" or "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
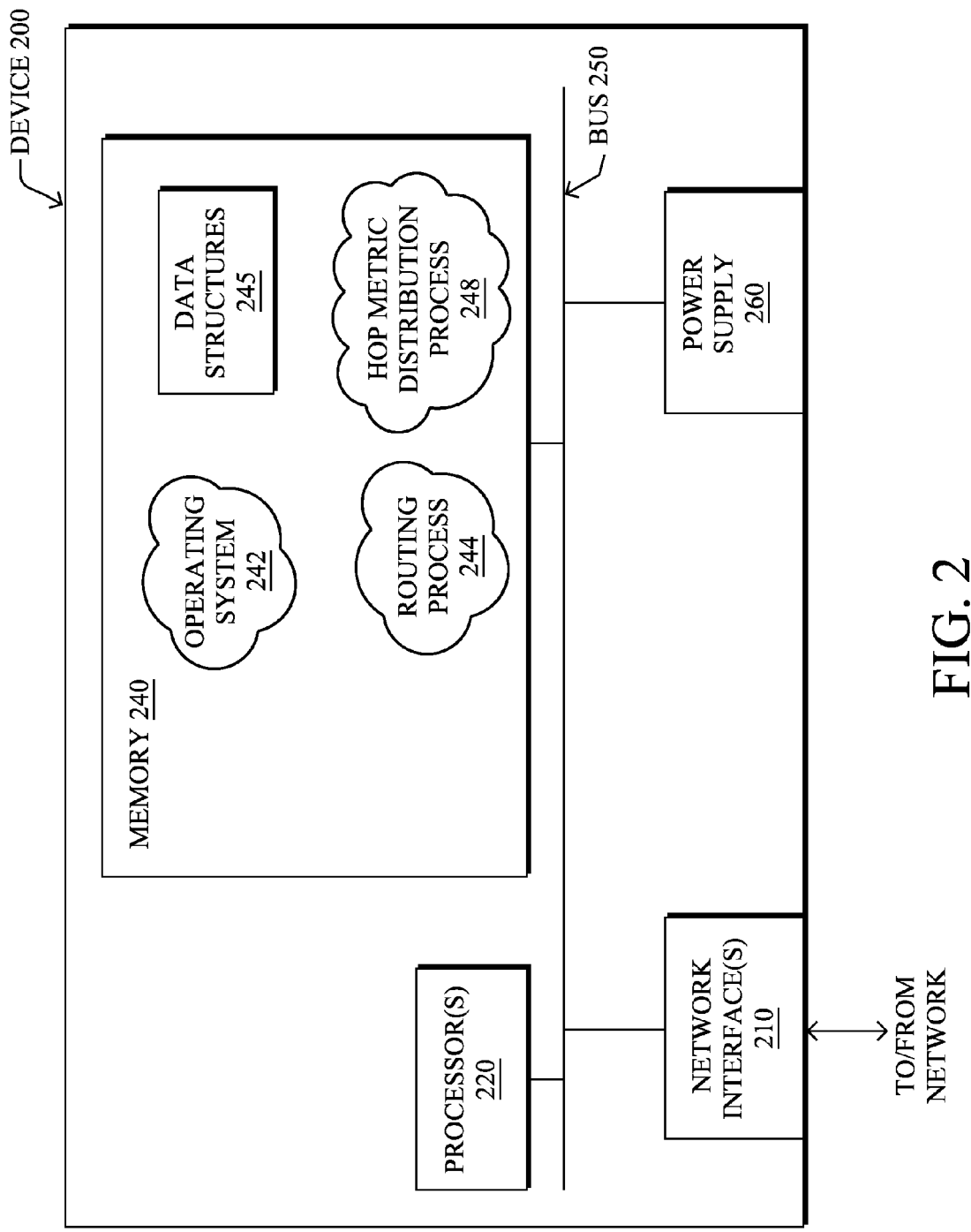
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative hop metric distribution process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link-state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Internet Draft, entitled "RPL: IPv6 Routing Protocol for Low Power and Lossy Networks"<draft-ietf-roll-rpl-19> by Winter, et al. (Mar. 13, 2011 version), provides a mechanism that supports multipoint-to-point (MP2P)

traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Low power and Lossy Networks (LLNs) may be used in a variety of applications (e.g. smart grids, smart cities, home, and building automation). Various challenges are presented with LLNs, such as lossy links, low bandwidth, battery operation, low memory and/or processing capability, etc. LLN link technologies typically communicate over a physical medium, e.g., shared-media, that is strongly affected by environmental conditions that change over time. Some examples include temporal changes in interference (e.g., other wireless networks or electric appliances), physical obstruction (e.g., doors opening and/or closing or seasonal changes in foliage density of trees), and propagation characteristics of the physical media (e.g., temperature or humidity changes). The time scales of such temporal changes can range between milliseconds (e.g., transmissions from other wireless networks) to months (e.g., seasonal changes of outdoor environment).

The net effect of these environmental factors is a change in link margin or the signal-to-noise ratio (SNR). When the link margin or SNR ratio falls too low, the receiver cannot properly decode the signal and results in failure to receive the packet. As a result, it is beneficial to select links that have a high link margin and SNR ratio such that any reduction in them can be tolerated.

As noted above, many different types of computer networks implement dynamic routing protocols to configure routes for delivering messages to their destination. The routing protocol chooses routes by optimizing path cost metrics and may be subject to constraints. Compared with more traditional (e.g., wired) networks, the strict resource constraints (e.g., limited memory, computation, and communication capabilities) combined with highly dynamic link characteristics typical of LLNs pose a number of challenges for dynamic routing protocols. That is, while route stability is generally important for any network, it can be especially important in LLNs due to their resource constraints. Link failures can cause expensive route repair operations. Effects on end-to-end communication performance (e.g., latency, throughput, and reliability) are difficult to maintain in the presence of link failures, especially in such resource-constrained environments.

For instance, with specific reference to the example of noise-based link metrics, link margin (or received signal strength indicator (RSSI)) and SNR have been used to represent the quality of a link for quite some time. For example, for link filtering, devices only use links that have a link margin or SNR above a configurable threshold. However, setting this threshold is non-trivial in ad-hoc environments. Increasing the threshold will likely increase route stability, but may cause network partitions in scenarios where paths must utilize links that have low link margin or SNR. In addition, perhaps the most popular path cost metric used in LLNs today is the expected (or estimated) transmission count (ETX) metric, which represents the expected number of transmissions to successfully deliver a message across a path. While ETX accurately reflects the current reliability of a path, it does not provide a good indication of its long-term stability. In particular, a link can still provide a good ETX even while it is operating near its receive sensitivity. However, when operating near the receive sensitivity, a small change in RSSI can result in a significant change in ETX. Further, through an SNR-Weight path cost, the per-hop path cost may be weighted by the SNR. However, such a solution does not allow a device to determine the distribution of SNR on links along a path. In particular, the metric does not provide any information on the minimum SNR of a link along the path. Still further, a "Max-Min" SNR metric technique may be used to select paths that attempt to maximize the minimum SNR along a path, thus observing the benefit of maximizing the SNR of links along a path. However, by only maintaining the minimum SNR along a path, the metric does not reflect any information on the SNR of other links along the path.

Hop Metric Distribution

The techniques herein allow a routing protocol to choose routes based on hop metric distributions along a path, where in one or more embodiments. For example, the techniques herein, when used specifically with noise-based link quality metrics (e.g., link margin/SNR), allow the routing protocol to choose routes that are likely to have long-term stability. In general, the techniques herein may illustratively achieve this by representing a path using a dynamic distribution of hop metrics, and having a routing protocol select paths that minimize the number of poor quality (e.g., low link margin/SNR) hops along a path. Note that in certain embodiments described herein, the resolution provided by the distribution is adaptive, where the adaptive resolution allows the distribution to provide the greatest information possible given an observed range of metric values and available resources to represent, maintain, and communicate distribution.

Specifically, according to one or more embodiments of the disclosure as described in detail below, a network device determines, for each particular path of a plurality of paths in a computer network, a hop metric distribution that indicates, for each interval of the hop metric distribution, a number of hops along the particular path that have a hop metric value within a corresponding interval. As such, the device may then select a path from the plurality of paths that minimizes the number of hops with correspondingly poor hop metric values along the selected path based on the hop metric distribution, and may forward traffic on the selected path, accordingly.

Illustratively, the techniques described herein may be performed by hardware, software, and/or firmware, such as in accordance with the hop metric distribution process 248, which may contain computer executable instructions executed by the processor 220 to perform functions relating to the novel techniques described herein, e.g., in conjunction with (or as a component of) routing process 244. For example, the techniques herein may be treated as extensions to conventional routing protocols, such as the various reactive and/or proactive protocols, and as such, may be processed by similar components understood in the art that execute those protocols, accordingly.

Operationally, a network device/node 200 may first determine the "hop metric values" of the hops along the particular paths according to one or more routing protocols. For instance, as described herein, a "hop metric" is a value indicative of a certain feature, measurement, constraint, etc., and may be related to the link 105 between two nodes, or else the node 200 itself. For example, the concept of using an adaptive distribution to communicate the quality of a path is not specific to using a particular type of metric, such as node constraints or link metrics (e.g., noise-based link quality measurements, such as link margins or SNR). In particular, although certain illustrative examples below use SNR since that is a known metric that benefits significantly from the use of adaptive distributions (rather than the worst-case link alone), other possibilities for using adaptive distributions that benefit from knowing the quantity of devices/links within different metric ranges may include other link metrics, such as link capacity or link congestion, and node metrics, such as queue occupancy, resource availability, or node energy.

That is, using adaptive distributions is very useful in cases where it is important to know how many devices are reporting different levels for the metric rather than just the sum, max, or min values. Example hop metrics may comprise, e.g., link margin, received signal strength indicator (RSSI), link signal-to-noise ratio (SNR), link expected transmission count (ETX), link cost, link bandwidth, link packet loss, node energy level, node energy source type, a node memory constraint, a node processing constraint, and others as would be understood by those skilled in the art.

The choice of which metric(s) to use depends on the particular routing protocol in use, and upon the capabilities of the link-layer. For example, when choosing between link margin and SNR, LLNs typically operate under strict cost and capability constraints, and a transceiver (network interface 210) may only be able to measure RSSI with relatively low sample rates. Furthermore, obtaining RSSI readings while not receiving a packet can be an energy intensive operation for battery-powered devices. As a result, a system may choose not to implement noise-floor estimation in the link layer to save on overall system cost. However, whether it is link margin or SNR, or any other metric value, the goal is to avoid selecting a path with the poorest (lowest quality) distribution of values for links/devices (hops) along the path.

Figure 3A:
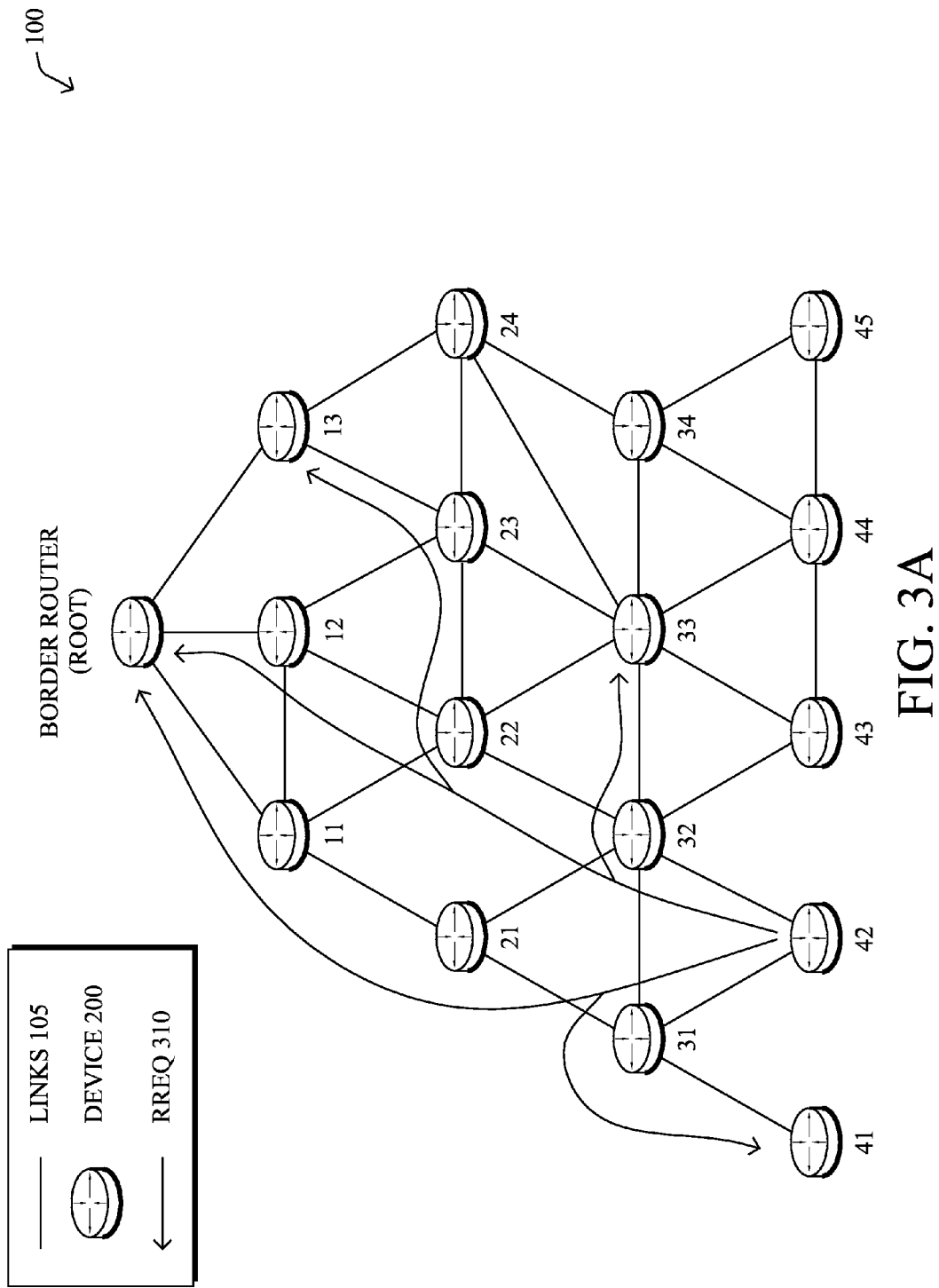
FIGS. 3A-3B illustrate an example of a reactive routing protocol.
Figure 3B:
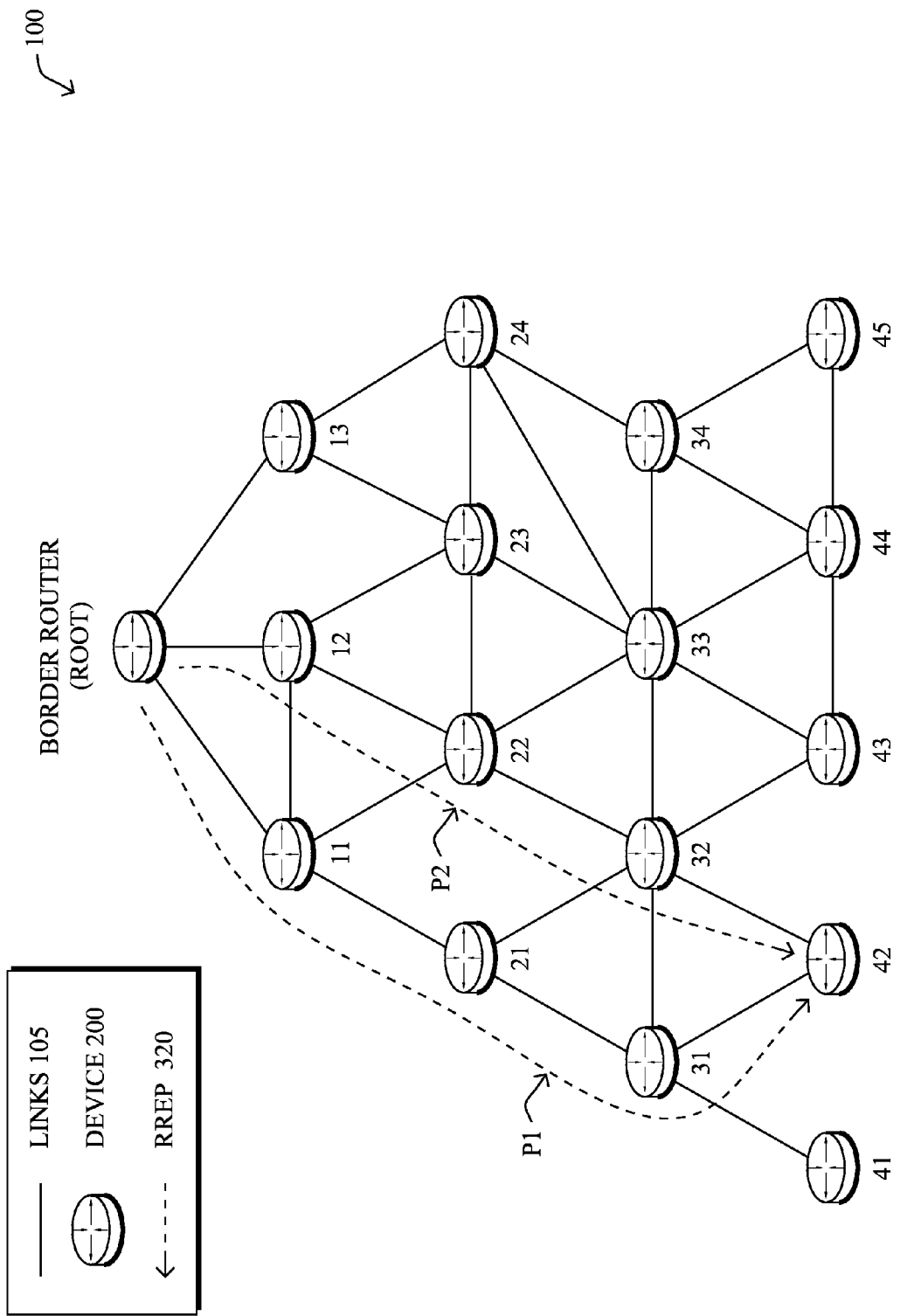

The determination of the hop metrics may be according to any selected routing protocol, such as, e.g., a reactive routing protocol (e.g., AODV, DSR, DYMO, etc.), a proactive distance vector routing protocol (e.g., RPL, etc.), and a proactive link-state routing protocol (e.g., OSPF, ISIS, OLSR, etc.). For instance, while a proactive link-state routing protocol may allow each node 200 of the network to be aware, generally, of each other node 200 within the network 100 and the links 105 between them (as in FIG. 1), a reactive routing protocol must first request a set of reachable paths from which to select a path for forwarding traffic to a destination. For example, as shown in FIG. 3A, assuming that a source device (e.g., node 42) wishes to send a message to another device (e.g., the border router, or any other device within the network 100), then the source device may generate and flood a route request (RREQ) message 310 into the network to determine which devices could be used for a path to the desired destination. As shown in FIG. 3B, one or more route reply (RREP) messages 320 may then be returned from the destination (or intermediate devices that have already established a path the rest of the way to the destination) that carries/creates the paths from which the device can chose. For the techniques herein, these RREP messages 320 may be configured to carry the hop metric information (e.g., node constraints of nodes along the path, or else link metrics of the path's links).

Figure 4:
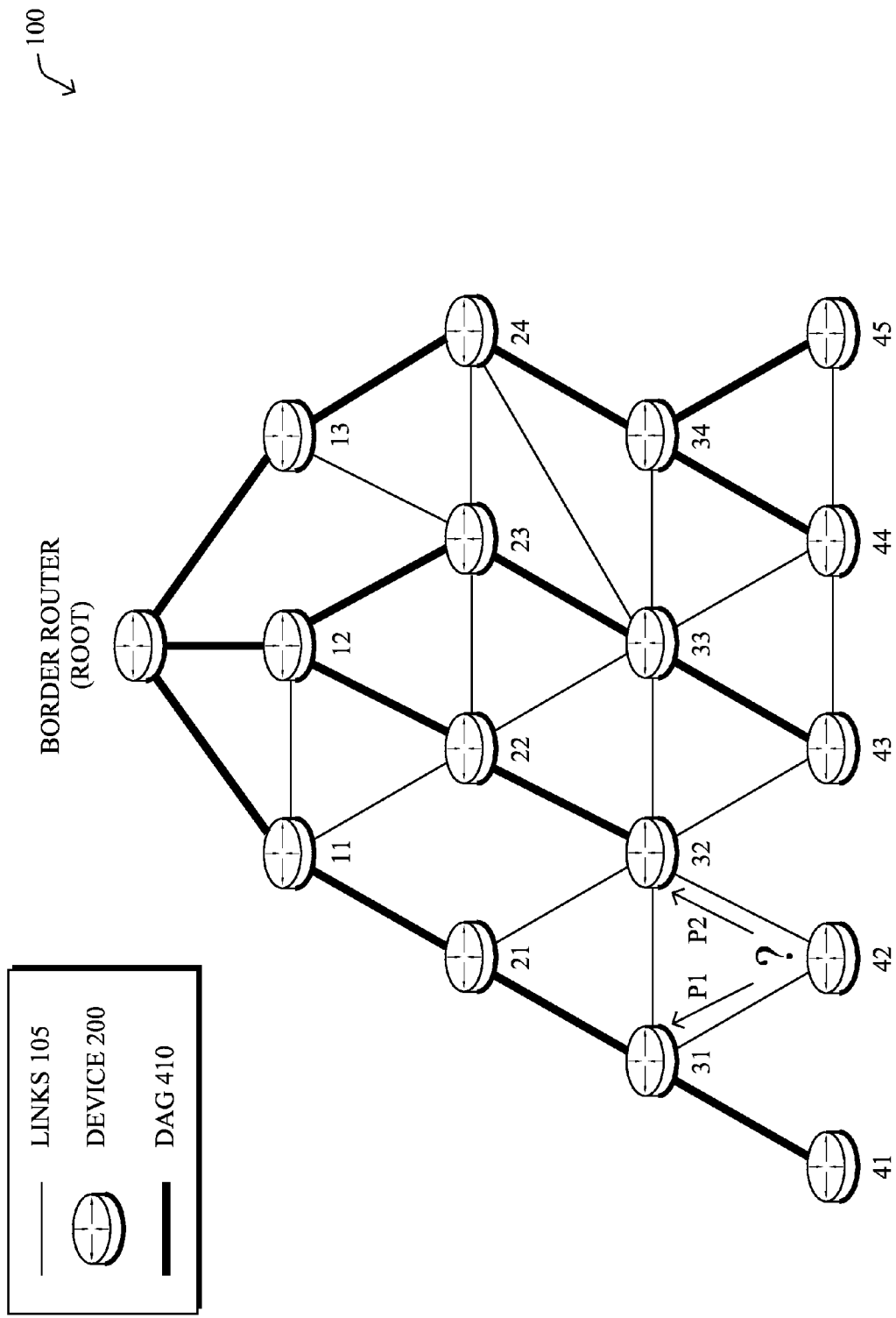
FIG. 4 illustrates an example of a proactive distance vector routing protocol.

Alternatively, FIG. 4 illustrates an example simplified DAG that may be created, e.g., through the techniques described above for proactive distance vector protocols such as RPL. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein. In addition, the creation of the DAG may also provide for one or more alternate parents (next-hops). When a device 200, e.g., node 42, is then selecting between two parent nodes (e.g., nodes 31 and 32), and thus two corresponding paths, the selecting node may determine the distributions of those two paths from the control messages used to advertise the DAG links, accordingly. Note that while a DAG 310 is shown, other routing topologies may be created, and a DAG is merely one example of a routing protocol topology that may be created and utilized according to proactive distance vector routing techniques.

With the hop metrics collected, the techniques herein represent the hop metric values along a path using an adaptive distribution. In particular, devices may maintain the occurrence of certain metric values over discrete intervals/ranges, e.g., represented as a vector of intervals. Said differently, the network device may determine, for each particular path, a hop metric distribution that indicates, for each interval of the hop metric distribution, a number of hops along the particular path that have a hop metric value within a corresponding interval.

Figure 5A:
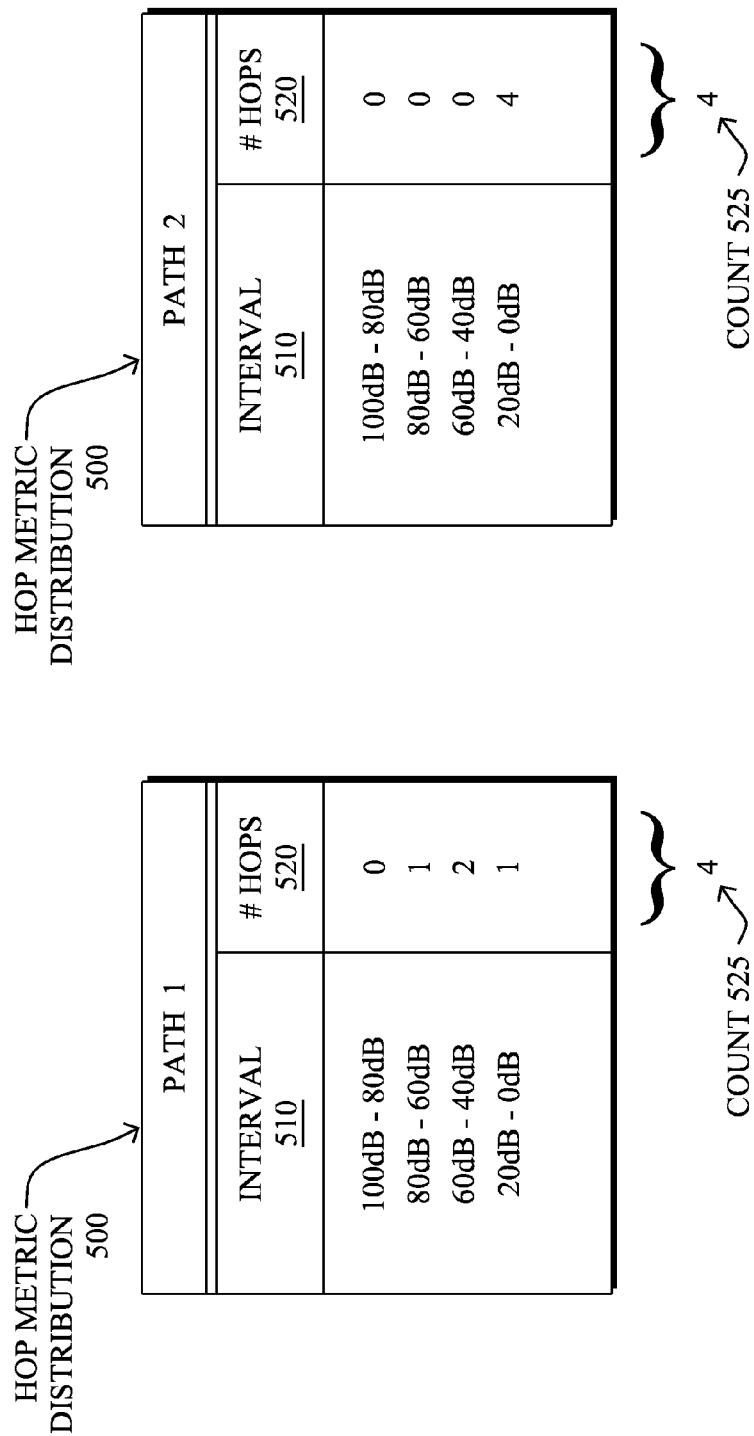
FIGS. 5A-5B illustrate examples of hop metric distributions.

FIG. 5A illustrates an example hop metric distribution 500 for two illustrative paths "P1" (e.g., 42-31-21-11-root) and "P2" (e.g., 42-32-22-12-root). In general, each interval 510 may contain a start value of the interval, for example, a minimum value of the interval (e.g., 60 dB), an explicit end value of the interval, for example, a maximum value of the interval (e.g., 80 dB) or else a width of the interval, for example, to determine the maximum value of the interval (e.g., 20 dB). In addition, each interval vector may further indicate a number of hops (a frequency count) 520 that indicates the number of hops (nodes/links) that fall within that interval. Notably, as described below, the sum of the numbers of hops 520, i.e., "count 520," may be used as an indication of the number of hops within each respective path.

As shown in FIG. 5A, an example distribution 500 describing a first path P1 in terms of SNR may be as follows:
  100 dB to 80 dB: 0;
  80 dB to 60 dB: 1;
  60 dB to 40 dB: 2; and
  20 dB to 0 dB: 1.

The first example distribution 500 for P1 indicates that there are four hops (count 525). Of which, one link is marginal compared to the other 3 links. Contrast this with a different distribution 500 shown for path P2:
  100 dB to 80 dB: 0;
  80 dB to 60 dB: 0;
  60 dB to 40 dB: 0; and
  20 dB to 0 dB: 4.

The second example distribution 500 for P2 also indicates there are four hops. However, all four of the links are marginal. The techniques herein, therefore, may be used to readily distinguish between these paths, where a particular path (e.g., path P1) may be selected based on the distributions 500 as described below. Note that in one specific embodiment, where the number of hops is zero for a particular interval, that interval need not be included within the distribution 500.

Illustratively, the distribution examples above demonstrate an example where the "thresholds" (the boundaries or bounds between intervals) appear fixed. However, according to one or more embodiments herein, the adaptivity of the distributions 500 provides for choosing appropriate thresholds. For instance, when adding additional hops (nodes/links) to the distribution, the adding device has a number of options. If the new hop's metric value falls within an existing interval, the device may simply increment the number of hops 520 within that corresponding interval 510. Otherwise (i.e., the hop metric value is not within an existing interval), the device may adjust the intervals to include the given metric, such as by adding a new interval, or extending existing interval boundaries (i.e., the range of an existing interval). Adding new intervals is beneficial because it provides greater resolution into the distribution. However, doing so also increases the overhead of maintaining and communicating the distribution. Increasing the range of an interval keeps the size of the representation constant, but effectively reduces the resolution of the distribution.

Figure 5B:
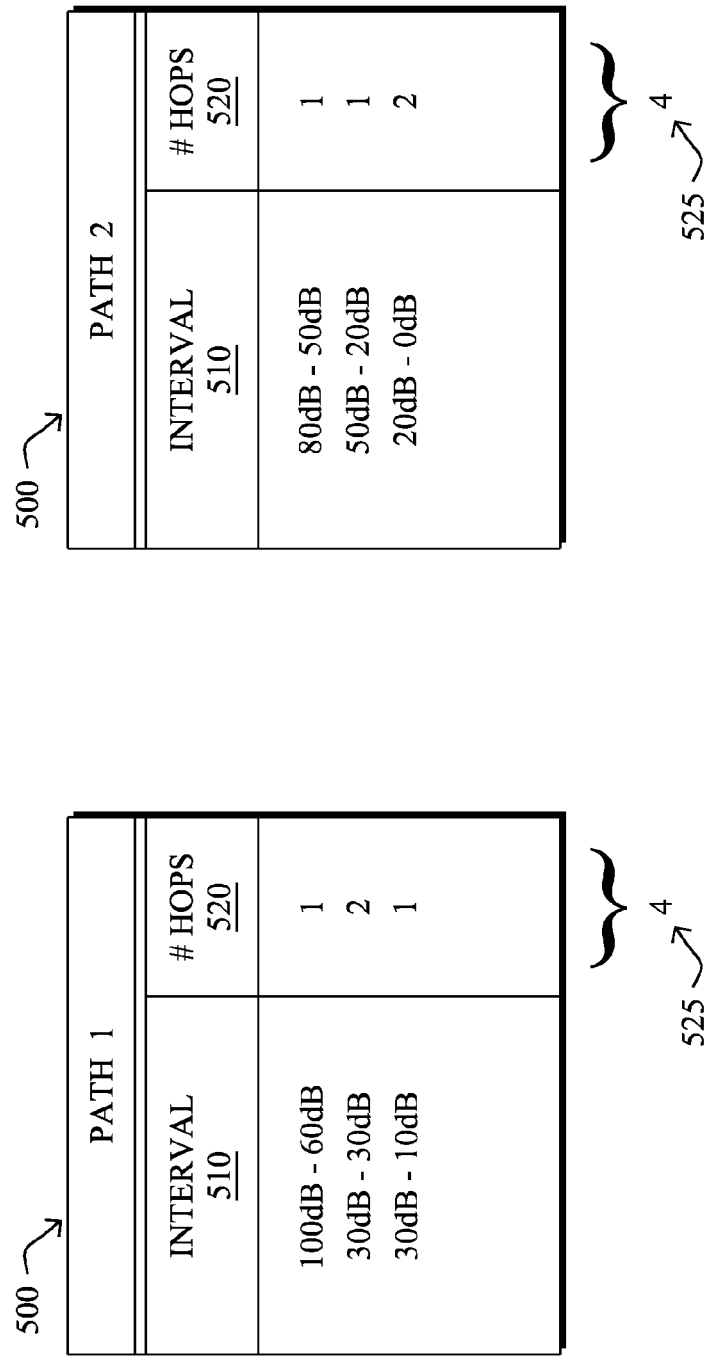

FIG. 5B illustrates another example of hop metric distributions 500 for paths P1 and P2 (e.g., with potentially updated values not related to FIG. 5A), where adaptive distribution management has created different intervals 510. In particular, as shown, the distribution 500 describing P1 may now be as follows:

100 dB to 60 dB: 1;
60 dB to 30 dB: 2; and
30 dB to 10 dB: 1.

Distribution 500 for path P2, on the other hand, may be populated as follows:

80 dB to 50 dB: 1;
50 dB to 20 dB: 1; and
20 dB to 0 dB: 2.

Here, it can be seen that the bounds of the intervals, as well as their width, are varied between the first and second distributions 500 (for paths P1 and P2), since the creation of the distributions may have resulted in different additions and/or expansions of intervals.

Note that in a specific embodiment, the number of intervals within a hop metric distribution 500 may be a configurable parameter (e.g., static and configurable), such as four in FIG. 5A or three in FIG. 5B, and may be dependent on system characteristics. For instance, many systems may choose to maintain only two to three intervals due limited memory and/or communication resources. As such, for adaptive distributions, the interval "adjusting" mentioned above implies dynamically extending existing interval boundaries of the static number of intervals.

Note also that the relative range of each interval may be dependent on the particular hop's characteristics. For example, for SNR, 10 dBm differences when operating near the noise floor can be much more significant than 10 dBm differences when operating with huge SNRs. Furthermore, the particular choice of thresholds may be determined based on expected characteristics or properties of the node/link, such as interference of the transceiver for SNR. In addition to local boundary tuning, the thresholds between the intervals may also be tuned based on data obtained from the network characteristics during deployment, such as by a network management device (e.g., a network management server or "NMS"). In this manner, the intervals of the hop metric distributions 500 (and their bounds/thresholds) are configured to be the same for all paths throughout the network. That is, in this illustrative embodiment, each distribution 500 will have the same intervals and the same boundaries, where the only difference per path is the number of hops 520 within each interval 510.

Figure 6:
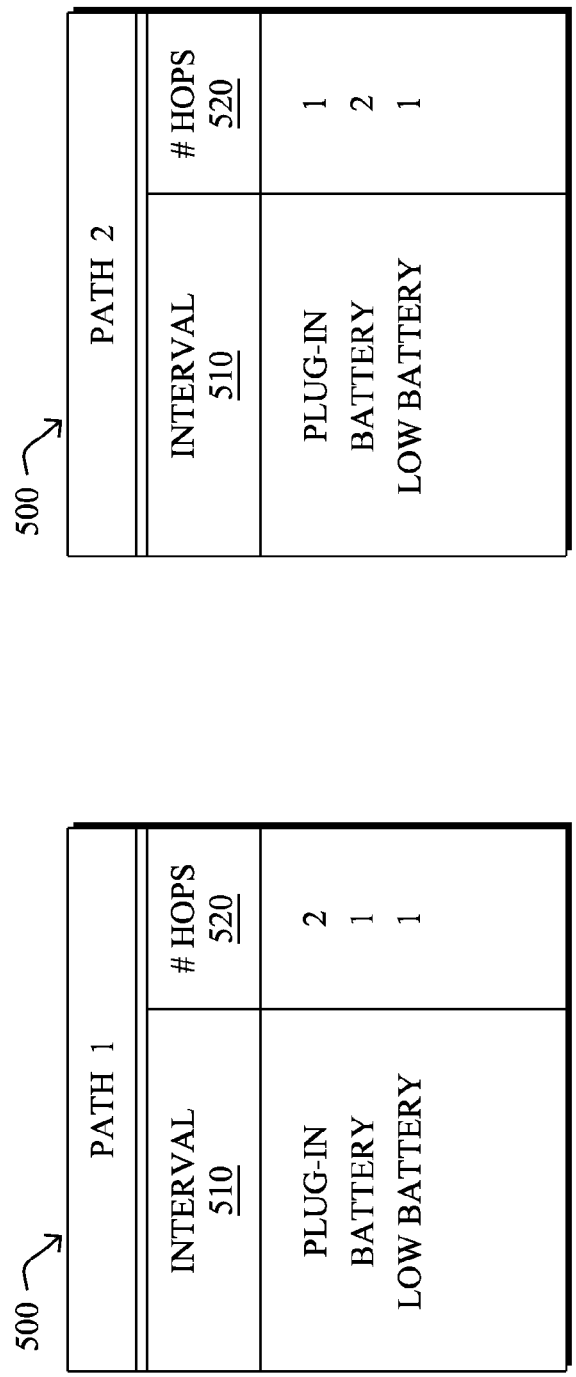
FIG. 6 illustrates another example of hop metric distributions.

Note again that alternative (or additional) hop metrics may be used. For example, as shown in FIG. 6, energy/power levels may be defined to have three intervals 510, namely "plug-in," "battery," and "low-battery." As such, a different distribution based on node constraints may be created, such as for path P1 as follows:

Plug-in: 2;
Battery: 1; and
Low Battery: 1;
and for path P2 as follows:
Plug-in: 1;
Battery: 2; and
Low Battery: 1.

Once the hop metric distributions 500 have been established, the techniques herein allow the network device to select a path (from a plurality of paths) that minimizes the number of hops with correspondingly "poor" hop metric values along the selected path. For instance, as it regards noise-based link quality metrics, the techniques may be used to choose paths that provide better route stability. In particular, since the goal is to increase path stability, one policy is to select paths that have the fewest number of hops (links/nodes) with relatively poor quality metric values (where "poor" may indicate a high value or a low value, depending upon the underlying metric being utilized, e.g., poor being a high link ETX versus low remaining batter power).

An illustrative path selection algorithm may selecting from a plurality of paths may iteratively compare distributions of two paths from the plurality of paths until a final selected path is chosen. For example, to compare the paths, the following algorithm may be utilized:

1) If the minimum intervals (poorest hop metric intervals) are different between the distributions (e.g., as in FIG. 5B, with 30-10 dB and 20-0 dB), select the path that has a least-poor poorest hop metric interval (e.g., a larger lower bound on the link SNR, such as path P1 with 10 dB, as opposed to path P2's 0 dB).
2) If the poorest hop metric interval of the distributions are equal (e.g., as in FIG. 5A, with 20-0 dB for both paths), or where simply the lower bounds of the minimum interval are the same (e.g., 0 dB), the path with the lowest number of hops 520 within the poorest hop metric interval (the minimum interval) may be selected (e.g., in FIG. 5A, path P1 having one hop in the poorest interval, as opposed to path P2 having four hops).
3) If the number of hops (within the equal poorest hop metric intervals of step 2) are the same (e.g., as in FIG. 6, where each path P1 and P2 both have one device within the low battery interval), the algorithm moves to the next-poorest hop metric interval, and returns to step 1 to compare the two paths based on the next interval, accordingly (e.g., as in FIG. 6, the battery interval allows for selection of P1, having one battery device (not already a low battery device), while P2 has two such battery devices).

Notably, the hop metric distribution may be used by itself, since it effectively encodes hop-count information in the number of hop counts 525. That is, the hop metric distribution may be utilized as an indication of path total hop count (525), such that the path may also be selected based on the path total hop count in addition to the hop metric distribution 500. Furthermore, the hop metric distribution (e.g., for SNR) may also be used in conjunction with other route metrics, such as ETX, or even other different hop metric distributions (e.g., combining distributions 500 from FIG. 5A and FIG. 6), where certain metrics may be given greater priority, but where otherwise equal choices may be decided by different metrics/distributions, accordingly. Still further, the distributions 500 may be used for constraint based routing, such as limiting selection of paths to only those with fewer than a certain number of its hops within certain poor quality intervals. For example, rather than simply "battery or no battery" or "an SNR above X only," the techniques herein allow for constraint policies to provide for "no more than X low-power battery devices" or "no more than Y hops with an SNR below Z," accordingly.

Figure 7:
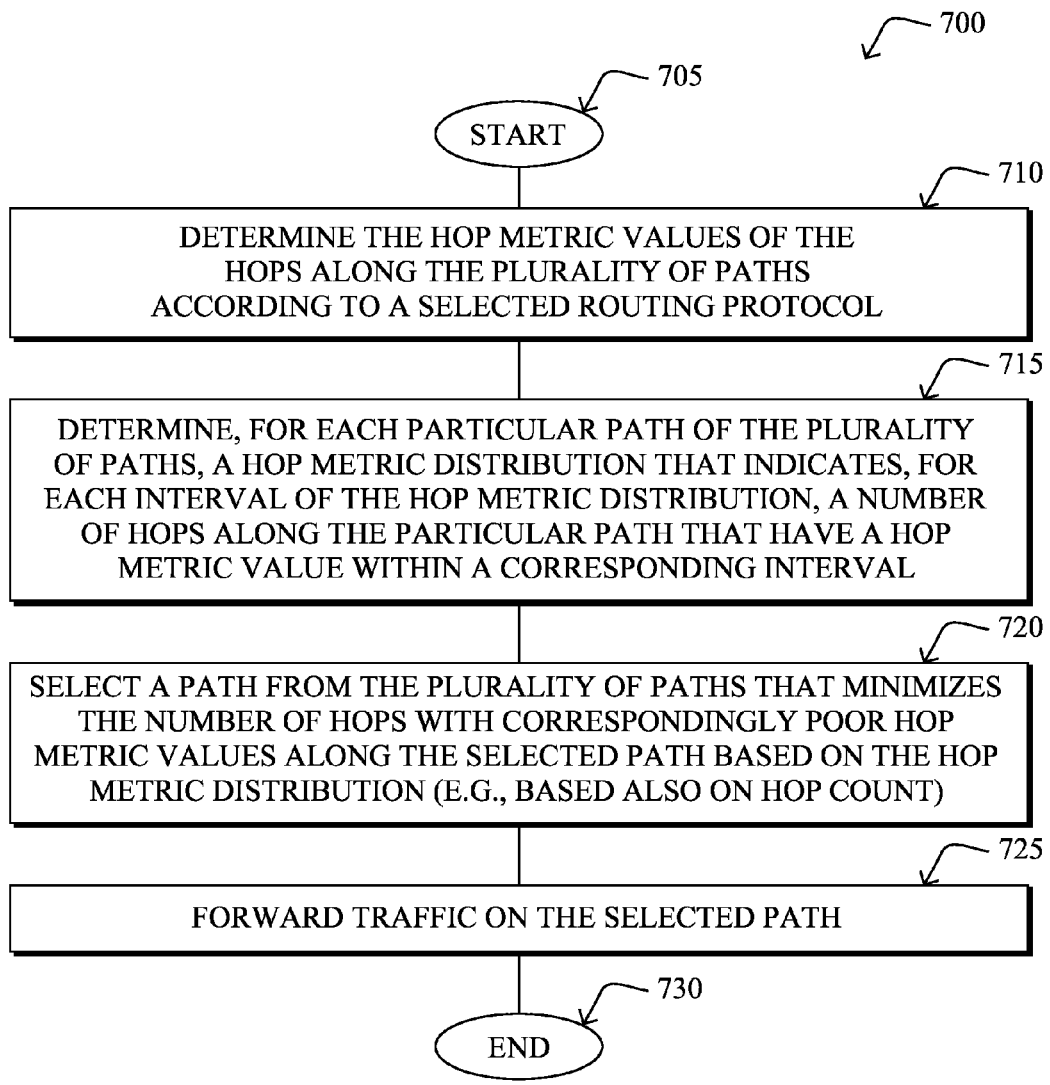
FIG. 7 illustrates an example simplified procedure for path selection based on hop metric distributions in a computer network.

FIG. 7 illustrates an example simplified procedure for path selection based on hop metric distributions in a computer network in accordance with one or more embodiments described herein. The procedure 700 may start at step 705, and continues to step 710, where, as described in greater detail above, a network device 200 may determine the hop metric values of the hops along a plurality of paths according to a selected routing protocol (e.g., reactive or proactive). As such, in step 715, the device may determine, for each particular path of the plurality of paths, a hop metric distribution 500 that indicates, for each interval 510 of the hop metric distribution, a number of hops 520 along the particular path that have a hop metric value within a corresponding interval. Based on the hop metric distributions (e.g., a single hop metric, a corresponding hop count 525, other routing metrics, etc.), in step 720 the device may then select a path from the plurality of paths that minimizes the number of hops with correspondingly poor hop metric values along the selected path as described in detail above. In step 725, the device may forward traffic (e.g., packets 140) on the selected path, and the simplified procedure 700 may end in step 730. Notably, the procedure may continually update the distribution, and may then re-select paths based thereon, accordingly.

Figure 8:
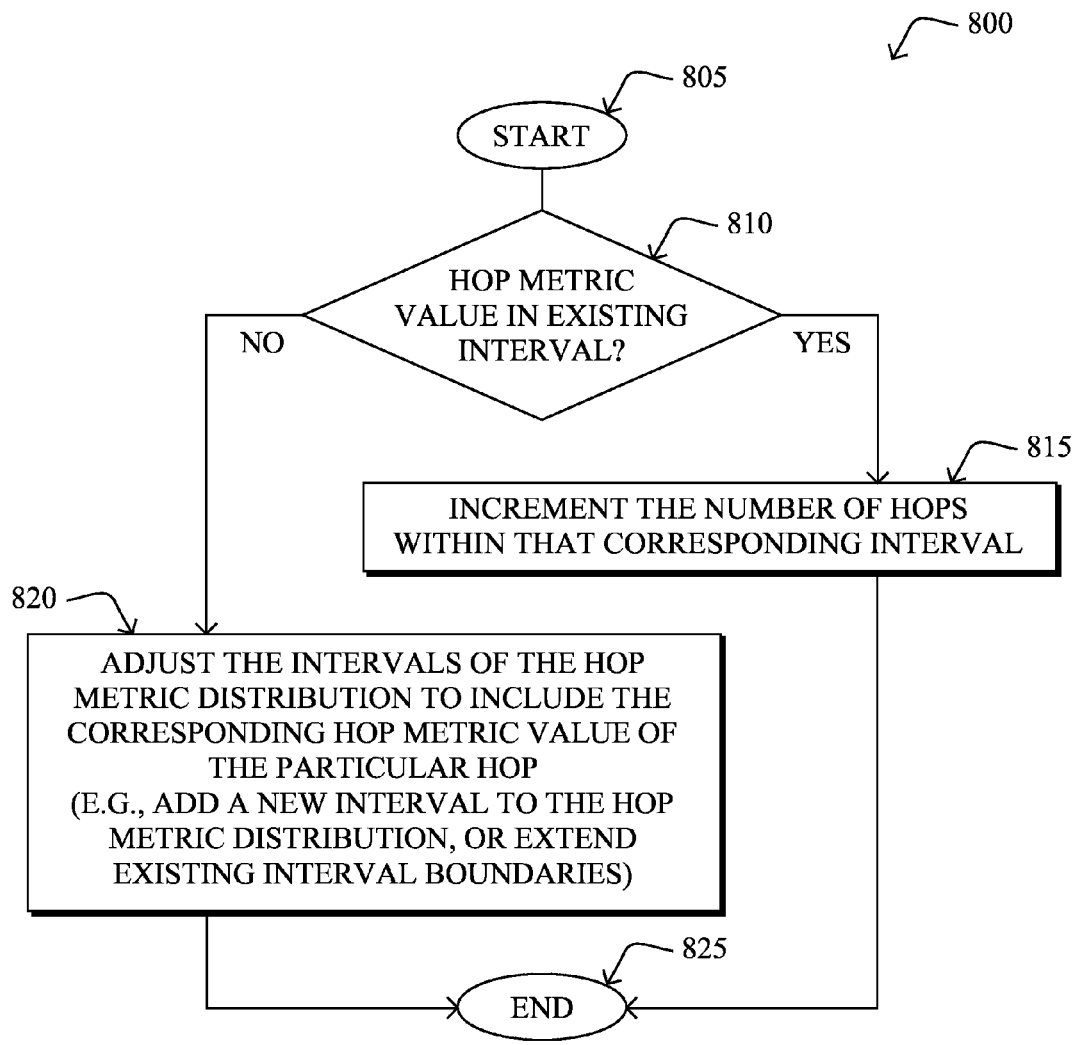
FIG. 8 illustrates another example simplified procedure for path selection based on hop metric distributions in a computer network, particularly for adding a particular hop to the distribution.

In addition, FIG. 8 illustrates another example simplified procedure for path selection based on hop metric distributions in a computer network in accordance with one or more embodiments described herein, particularly for adding a particular hop to the distribution. The procedure 800 may start at step 805, and continues to step 810, where, as described in greater detail above, the adding device may determine whether the particular hop metric value is within an existing interval. If so, then in step 815 the device may simply increment the number of hops within that corresponding interval. However, if the metric does not fall within an existing interval, then in step 820 the device may adjust the intervals of the hop metric distribution 500 to include the corresponding hop metric value of the particular hop. For example, as described above, the device may either add a new interval to the hop metric distribution, or else may extend existing interval boundaries, e.g., depending upon various configuration. The procedure 800 may then end in step 825, accordingly.

Figure 9:
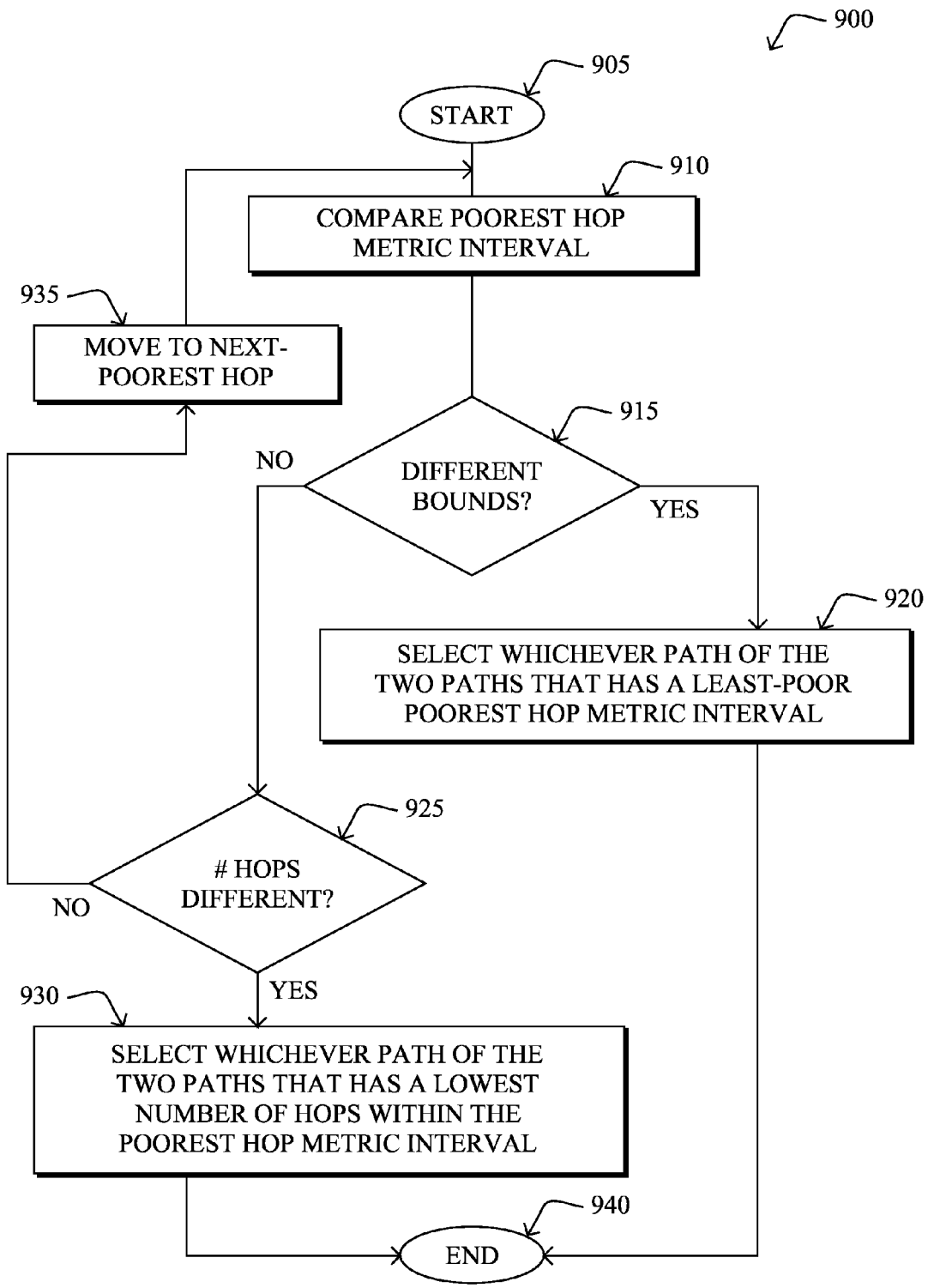
FIG. 9 illustrates another example simplified procedure for path selection based on hop metric distributions in a computer network, particularly for iteratively comparing distributions of two paths until a final selected path.

Moreover, FIG. 9 illustrates another example simplified procedure for path selection based on hop metric distributions in a computer network in accordance with one or more embodiments described herein, particularly for iteratively comparing distributions of two paths until a final selected path. The procedure 900 may start at step 905, and continues to step 910, where, as described in greater detail above, a poorest hop metric interval of two (or more) paths may be compared, and if that interval has different lower bounds in step 915, then the device may select whichever path of the two paths that has a least-poor poorest hop metric interval in step 920. Conversely, if the interval is the same, then in step 925 the device may determine whether the numbers of hops within that interval are different. If they are different, then in step 930 the device may select whichever path of the two paths that has a lowest number of hops within the poorest hop metric interval. On the other hand, should the number of hops also be the same for that poorest hop metric interval, then in step 935 the device may move to the next-poorest hop interval, and the comparison repeats at step 910 for that corresponding interval. The procedure 900 may end in step 940 once a path is selected (in step 920 or 930) for forwarding traffic.

It should be noted that while certain steps within procedures 700-900 may be optional as described above, the steps shown in FIGS. 7-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-900 are described separately, certain steps from each procedure may be incorporated into each other procedure, and the procedures are not meant to be mutually exclusive.

The techniques described herein, therefore, provide for path selection based on hop metric distributions in a computer network. In particular, the techniques herein providing information about the distribution of hop metrics (e.g., link margin/SNR values or any other suitable hop metric) for hops along a path. With specific regard to noise-based link quality metrics, such as link margin/SNR, the techniques herein improve path stability, which notably reduces route repair overhead and variation in communication latency, throughput, and reliability. In addition, the techniques herein reduce the memory and communication cost of maintaining hop metric properties of a path by adaptively updating the number and size of intervals in the distribution when adding new hop information.

Specifically, with knowledge of the metric distribution along a path, the routing protocol can make more informed path/route selections, such as based on the perceived stability of a path. In contrast, existing approaches attempt to represent a path using a single scalar value, or a minimum/maximum value. However, collapsing information about the hops into a single number removes any information about the particular spread of hop qualities along a path. For example, by selecting a path that merely selects a path with a minimum SNR along a path, if both paths have a minimum SNR of 5 dB, then both paths will appear the same, regardless of the distribution. In addition, still other existing approaches attempt to select a path that maximizes or minimizes some aggregate value of a path. The aggregate value is typically computed using a weighted sum of link metrics at each hop. However, such approaches generally fail to distinguish between a path that has one marginal link and nine mediocre links and a path that has three mediocre links and seven very good links.

While there have been shown and described illustrative embodiments that provide for path selection based on hop metric distributions in a computer network, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with any types of networks and/or protocols. In addition, while certain routing protocols are shown, such as certain reactive routing protocols, proactive routing protocols, source-routing protocols, link-state protocols, etc., other suitable routing protocols may be used, accordingly. Still further, while the primary example demonstrated herein relates to link margins and/or SNR, the techniques herein are not so limited, and are applicable to any suitable hop metric.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, for each particular path of a plurality of paths in a computer network, a hop metric distribution that indicates, for each interval of a plurality of intervals in the hop metric distribution, a number of hops along the particular path that have a hop metric value within each corresponding interval of a plurality of intervals provided in the hop metric distribution, wherein each particular path includes a plurality of hops and the hop metric distribution associates each of the plurality of hops with one of the plurality of intervals, wherein the hop metric distribution is adaptive;
    selecting a path from the plurality of paths that minimizes the number of hops associated with an interval within the plurality of intervals that has a poor hop metric value along the selected path based on a number of hops in each interval of the hop metric distribution; and
    forwarding traffic on the selected path.

2. The method as in claim 1, further comprising:
    adding a particular hop to the distribution by:
        in response to a corresponding hop metric value of the particular hop being within an existing interval, incrementing the number of hops within that corresponding interval; and
        in response to the corresponding hop metric value of the hop not being within an existing interval, adjusting the intervals of the hop metric distribution to include the corresponding hop metric value of the particular hop.

3. The method as in claim 2, wherein adjusting comprises one of either adding a new interval to the hop metric distribution, or extending existing interval boundaries.

4. The method as in claim 2, wherein a number of intervals within the hop metric distribution is static and configurable, and wherein adjusting comprises dynamically extending existing interval boundaries of the static number of intervals.

5. The method as in claim 1, wherein selecting comprises:
    iteratively comparing distributions of two paths from the plurality of paths until a final selected path, wherein comparing comprises:
        in response to a poorest hop metric interval being different between the distributions, selecting whichever path of the two paths that has a least-poor poorest hop metric interval;
        in response to the poorest hop metric interval of the distributions being equal, selecting whichever path of the two paths that has a lowest number of hops within the poorest hop metric interval; and
        in response to the number of hops within the equal poorest hop metric intervals being the same, comparing the two paths at a next-poorest hop metric interval.

6. The method as in claim 1, wherein selecting comprises:
    selecting the path based on a plurality of different hop metric distributions.

7. The method as in claim 1, wherein selecting comprises:
    utilizing the hop metric distribution as an indication of path total hop count; and
    selecting the path based on the path total hop count in addition to the hop metric distribution.

8. The method as in claim 1, wherein the intervals of the hop metric distribution and their bounds are configured to be the same between the plurality of paths.

9. The method as in claim 1, further comprising:
    determining the hop metric values of the hops along the particular paths according to a reactive routing protocol.

10. The method as in claim 1, further comprising:
    determining the hop metric values of the hops along the particular paths according to a proactive distance vector routing protocol.

11. The method as in claim 1, further comprising:
    determining the hop metric values of the hops along the particular paths according to a proactive link-state routing protocol.

12. The method as in claim 1, wherein the hop metric of the hop metric distribution is selected from a group consisting of: link margin; received signal strength indicator (RSSI); link signal-to-noise ratio (SNR); link expected transmission count (ETX); link cost; link bandwidth; link packet loss; node energy level; node energy source type; a node memory constraint; and a node processing constraint.

13. An apparatus, comprising:
    one or more network interfaces to communicate in a computer network;
    a processor coupled to the network interfaces and adapted to execute one or more processes; and
    a memory configured to store a process executable by the processor, the process when executed operable to:
        determine, for each particular path of a plurality of paths in a computer network, a hop metric distribution that indicates, for each interval of a plurality of intervals in the hop metric distribution, a number of hops along the particular path that have a hop metric value within each corresponding interval of a plurality of intervals provided in the hop metric distribution, wherein each particular path includes a plurality of hops and the hop metric distribution associates each of the plurality of hops with one of the plurality of intervals, wherein the hop metric distribution is adaptive;
        select a path from the plurality of paths that minimizes the number of hops associated with an interval within the plurality of intervals that has a poor hop metric value along the selected path based on a number of hops in each interval of the hop metric distribution; and
        forward traffic on the selected path.

14. The apparatus as in claim 13, wherein the process when executed is further operable to:
    add a particular hop to the distribution by:
        in response to a corresponding hop metric value of the particular hop being within an existing interval, incrementing the number of hops within that corresponding interval; and
        in response to the corresponding hop metric value of the hop not being within an existing interval, adjusting the intervals of the hop metric distribution to include the corresponding hop metric value of the particular hop.

15. The apparatus as in claim 13, wherein the process when executed to select is further operable to:
    iteratively compare distributions of two paths from the plurality of paths until a final selected path, the comparison comprising:

in response to a poorest hop metric interval being different between the distributions, selection of whichever path of the two paths that has a least-poor poorest hop metric interval;

in response to the poorest hop metric interval of the distributions being equal, selection of whichever path of the two paths that has a lowest number of hops within the poorest hop metric interval; and in response to the number of hops within the equal poorest hop metric intervals being the same, comparison of the two paths at a next-poorest hop metric interval.

16. The apparatus as in claim 13, wherein the process when executed to select is further operable to:
select the path based on a plurality of different hop metric distributions.

17. The apparatus as in claim 13, wherein the process when executed to select is further operable to:
utilize the hop metric distribution as an indication of path total hop count; and
select the path based on the path total hop count in addition to the hop metric distribution.

18. The apparatus as in claim 13, wherein the intervals of the hop metric distribution and their bounds are configured to be the same between the plurality of paths.

19. The apparatus as in claim 13, wherein the process when executed is further operable to:
determine the hop metric values of the hops along the particular paths according to a routing protocol selected from a group consisting of: a reactive routing protocol; a proactive distance vector routing protocol; and a proactive link-state routing protocol.

20. A tangible, non-transitory, computer-readable media having software encoded thereon, the software when executed by a processor operable to:
determine, for each particular path of a plurality of paths in a computer network, a hop metric distribution that indicates, for each interval of a plurality of intervals in the hop metric distribution, a number of hops along the particular path that have a hop metric value within each corresponding interval of a plurality of intervals provided in the hop metric distribution, wherein each particular path includes a plurality of hops and the hop metric distribution associates each of the plurality of hops with one of the plurality of intervals, wherein the hop metric distribution is adaptive;
select a path from the plurality of paths that minimizes the number of hops associated with an interval within the plurality of intervals that has a poor hop metric value along the selected path based on a number of hops in each interval of the hop metric distribution; and
forward traffic on the selected path.

* * * * *